United States Patent [19]
Urayama et al.

[11] Patent Number: 5,314,558
[45] Date of Patent: May 24, 1994

[54] METHOD OF APPLYING A DECORATIVE FOIL TO A TAPE CASSETTE REEL

[75] Inventors: Kiyoshi Urayama; Kazuo Ozawa, both of Miyagi, Japan

[73] Assignee: Sony Corporation, Tokyo, Japan

[21] Appl. No.: 73,972

[22] Filed: Jun. 8, 1993

Related U.S. Application Data

[60] Continuation of Ser. No. 641,598, Jan. 15, 1991, abandoned, which is a division of Ser. No. 108,372, Oct. 14, 1987, Pat. No. 4,995,565.

Foreign Application Priority Data

Jan. 12, 1986 [JP] Japan .................. 61-269402

[51] Int. Cl.$^5$ .............................................. B32B 33/00
[52] U.S. Cl. .................................... 156/251; 156/250; 156/261; 156/267
[58] Field of Search ............... 156/250, 251, 261, 267

[56] References Cited

U.S. PATENT DOCUMENTS

| | | | |
|---|---|---|---|
| 2,772,501 | 12/1956 | Malcolm | 156/261 |
| 3,559,324 | 2/1971 | Blair | 40/309 |
| 3,911,716 | 10/1975 | Weglin | 156/261 X |
| 4,254,919 | 3/1981 | Moodie | 242/71.8 |
| 4,457,474 | 7/1984 | Okahura et al. | 242/199 |
| 4,520,969 | 6/1985 | Wulfing et al. | 242/71.8 |
| 4,523,717 | 6/1985 | Morioka | 242/199 X |

FOREIGN PATENT DOCUMENTS

| | | | |
|---|---|---|---|
| 1739232 | 7/1957 | Fed. Rep. of Germany | |
| 1283333 | 10/1962 | France | 242/71.8 |
| 2075705 | 8/1971 | France | B65H 75/00 |
| 2119752 | 11/1983 | United Kingdom | G11B 23/08 |

OTHER PUBLICATIONS

Research Disclosure, No. 248, Dec. 1984, Havant GB p. 619 Art. Nr. 24848: "Adhesive Ring Application Fixture".

*Primary Examiner*—David A. Simmons
*Assistant Examiner*—M. Curtis Mayes
*Attorney, Agent, or Firm*—Philip M. Shaw, Jr.

[57] ABSTRACT

A cassette reel in use for a video tape cassette including a hub and an upper flange made of a transparent plate which is provided with an annular groove on one side surface of the upper flange and a foil deposited on the surface of the upper flange which is surrounded by the annular groove, so that the foil can be cut clearly and then deposited on the face of the upper flange which is surrounded by the annular groove by hot stamp with a clear outer profile, whereby decorative effects can be obtained by the foil covering the internal construction of the hub and when the cassette reel is used for a video tape cassette, the commercial value of the video tape cassette can be elevated.

1 Claim, 5 Drawing Sheets

METHOD OF APPLYING A DECORATIVE FOIL TO A TAPE CASSETTE REEL

This is a continuation of co-pending application Ser. No. 07/641,598 filed on Jan. 15, 1991, now abandoned, which is a divisional application of application Ser. No. 108,372, filed Oct. 14, 1987, now U.S. Pat. No. 4,995,565.

BACKGROUND OF THE INVENTION

1. Field of the Invention

This invention relates to a cassette reel, and is directed a cassette reel suitable for use as a video tape cassette.

2. Description of the Prior Art

There has previously proposed a cassette reel in use for a video tape cassette as shown in FIGS. 1 and 2 which respectively illustrate a perspective view and a cross-sectional view of a central portion thereof.

In FIGS. 1 and 2, reference numeral 1 designates a hub which has a lower flange 2 formed integrally therewith. In the present example, an upper flange 3 made of a transparent plastic plate is fixed on an upper end face 6 of the hub 1. More specifically, the upper flange 3 is fixed to the hub 1 by welding protrusions 5 formed on the lower face of its step portion 4 to the upper end face 6 of the hub 1 by ultrasonic heating. The upper flange 3 has a circular concave portion 7 having a diameter slightly smaller than the outer diameter of the hub 1 formed on the upper surface thereof and an opening 8 bored through the central portion thereof. A center pin 9, which will contact with a cassette reel holding spring provided on the inner surface of a video tape cassette housing, is loosely sandwiched in the opening 8 by the lower face of the central portion of the upper flange 3 and the upper end face of the central portion of the hub 1. A hub driving shaft inserting hole 10 is provided on the lower side of the hub 1 with which a hub driving shaft disposed in a video tape recorder will be engaged. Further, the hub 1 is provided on its outer peripheral surface with a clamp piece (not shown) and a clamp piece inserting portion 11 so as to grip and fix the end of a video tape (not shown). The lower flange 2 is provided along its outer periphery with reel brake engaging teeth 12.

FIG. 3 shows a video tape cassette equipped with two cassette reels 13 constructed as described above. A cassette housing 14 is provided on its upper surface with a window 15 made of a transparent plastic plate through which parts of the cassette reels 13 are visible so that the amounts of a video tape 16 wound on the respective reels 13, that is, the amount of a tape portion already used for recording and the amount of an unused tape portion can be confirmed. Incidentally, reference numerals 17 designate springs for holding the cassette reels 13, respectively.

When the cassette reels 13 are arranged in the cassette tape housing 14 having the window 15 made of a transparent plastic plate on the upper surface thereof as shown in FIG. 3, the amount of used and unused portions of the video tape 16 can be seen so that it is convenient for practical use. However, the transparent window 15 makes the internal construction of the hub 1 visible through the bottom surface 7A of the concave portion 7, which detracts from the appearance of the video tape cassette.

To attend to this problem, it may be proposed to deposit a metallic foil such as a gold foil on the bottom surface 7A of the concave portion 7 of the transparent upper flange 3 so as to make the internal construction of the hub 1 invisible and also produce a decorative effect. To be specific, as shown in FIG. 4, a transferable foil film 19 having a transferable metallic foil 18 deposited thereon is placed on the bottom surface 7A of the concave portion 7 of the upper flange 3 and then pressed by a heated hard rubber stamper 20 to transfer the metallic foil 18 to the bottom surface 7A of the concave portion 7. In other words, a hot stamp is carried out by the use of a metallic foil layer 21, as shown in FIG. 5.

However, with the conventional cassette reels 13, the periphery portion of the transferable metallic foil layer 19 cannot be cut satisfactorily so that it is occasionally impossible to transfer the metallic foil 18 to the bottom surface 7A in compliance with the profile of the hard rubber stamper 20 and hence to form a metallic foil layer 21 with its peripheral profile conforming to that of the bottom surface 7A of the concave portion 7.

OBJECTS AND SUMMARY OF THE INVENTION

In view of the problem mentioned above, it is an object of the present invention to provide a cassette reel which has a metallic foil formed with its outer profile clearly transferred so as to make the internal construction of the hub invisible as well as produce decorative effects.

To achieve the above object, the present invention provides a cassette reel including a hub and an upper flange made of a transparent plate, comprising: an annular groove formed on one side surface of the upper flange; and a foil deposited on a surface of the upper flange which is surrounded by the annular groove.

These and other objects, feature and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

Figure 1:
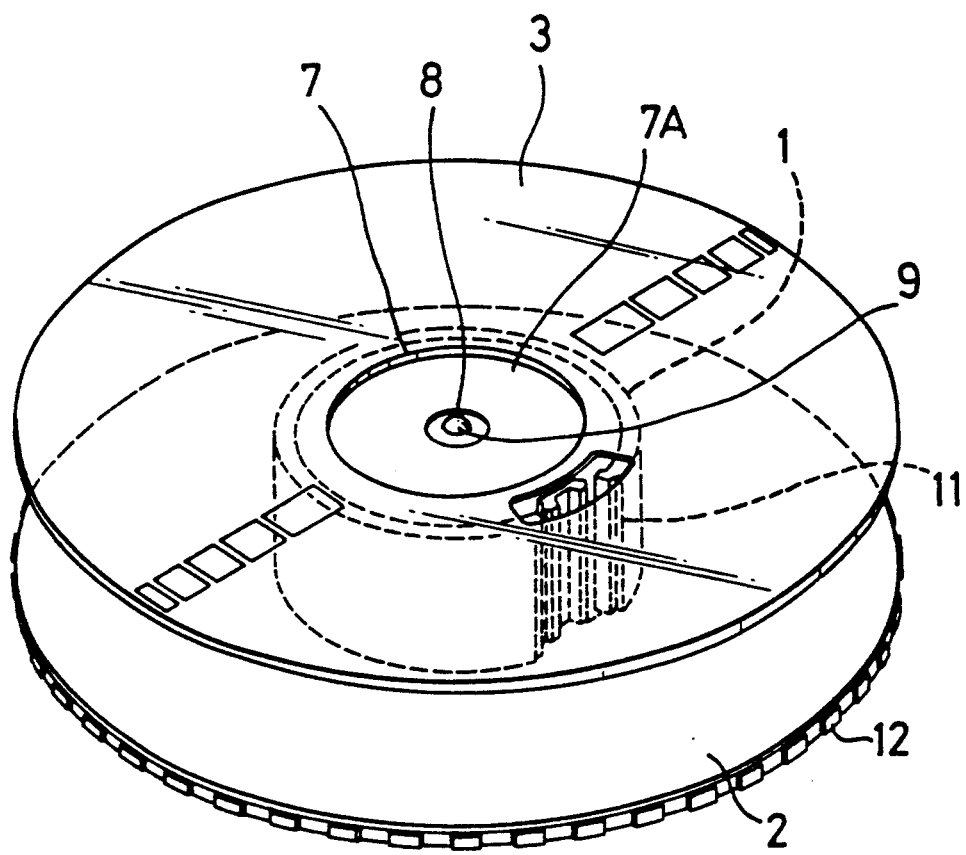
FIG. 1 is a perspective view showing a previously proposed cassette reel.
Figure 2:
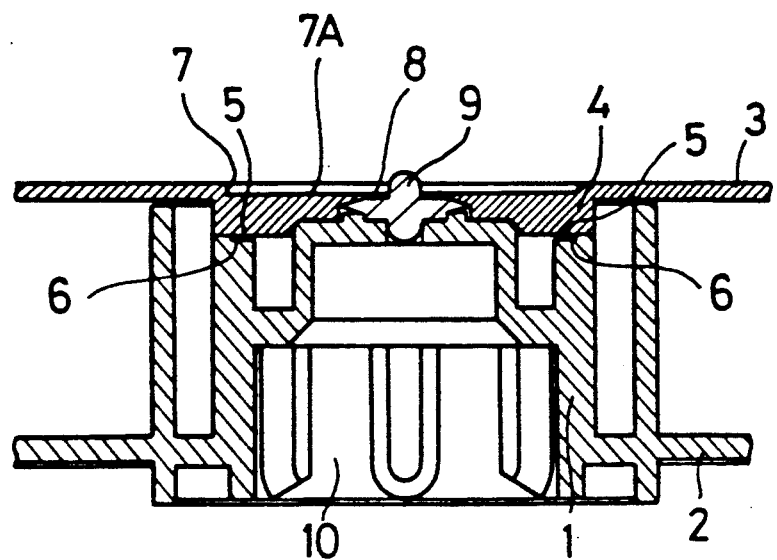
FIG. 2 is an enlarged cross-sectional view of a central portion of the cassette reel shown in FIG. 1.
Figure 3:
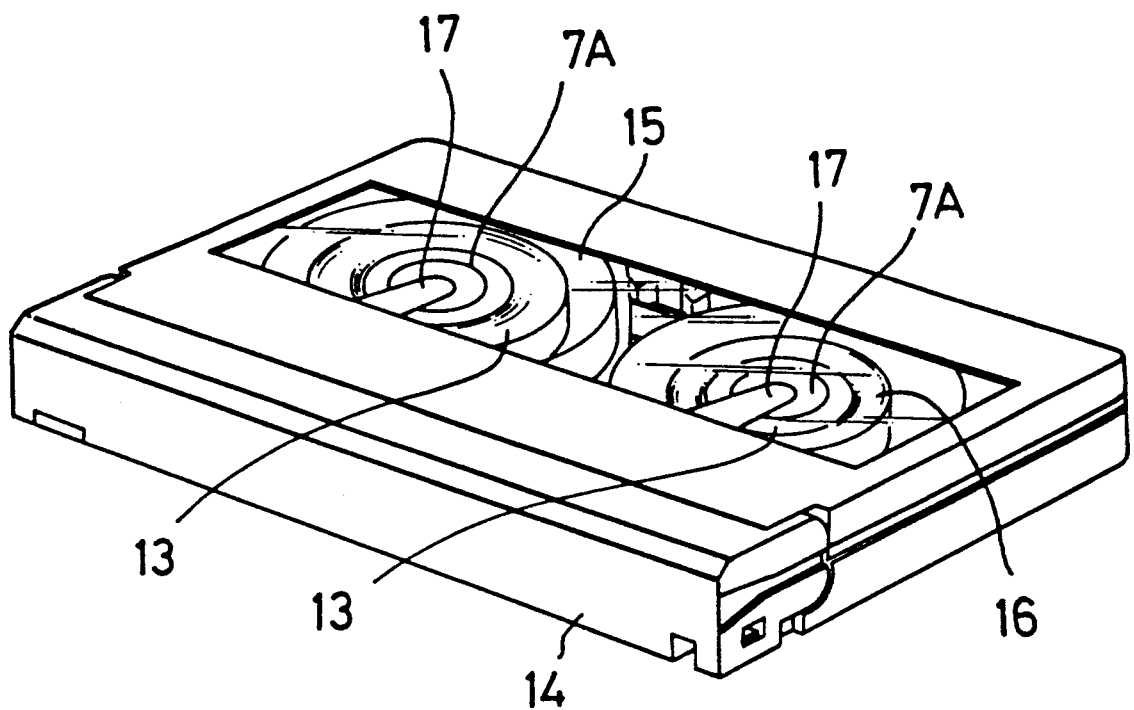
FIG. 3 is a perspective view showing the appearance of a prior art video tape cassette.
Figure 4:
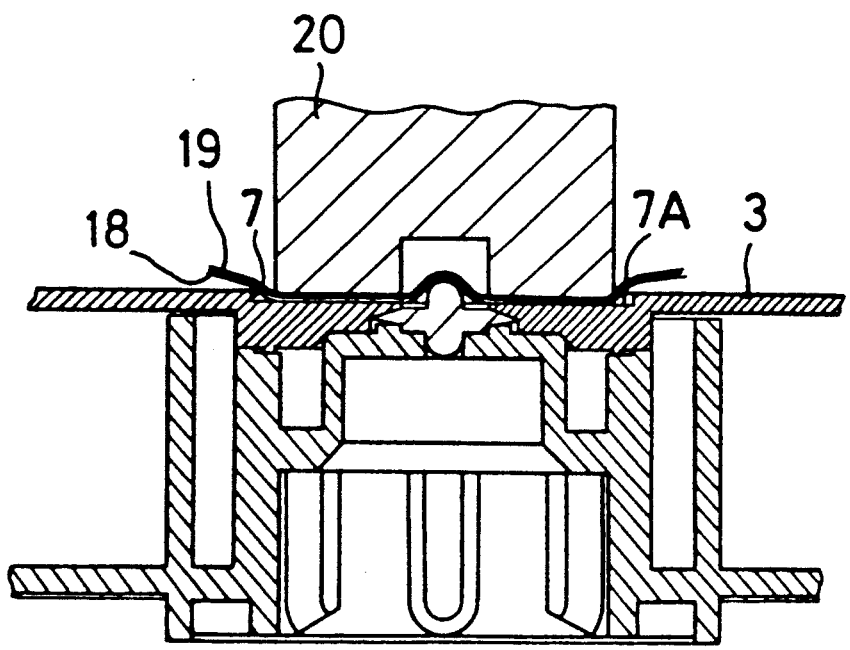
FIG. 4 is an enlarged cross-sectional view showing how a metallic foil is transferred to the center portion of an upper flange in the prior art.
Figure 5:
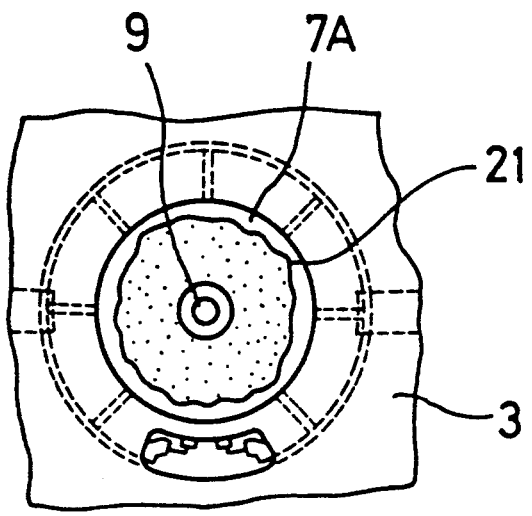
FIG. 5 is a top plan view of a prior art hub flange showing a metallic foil layer deposited.
Figure 6:
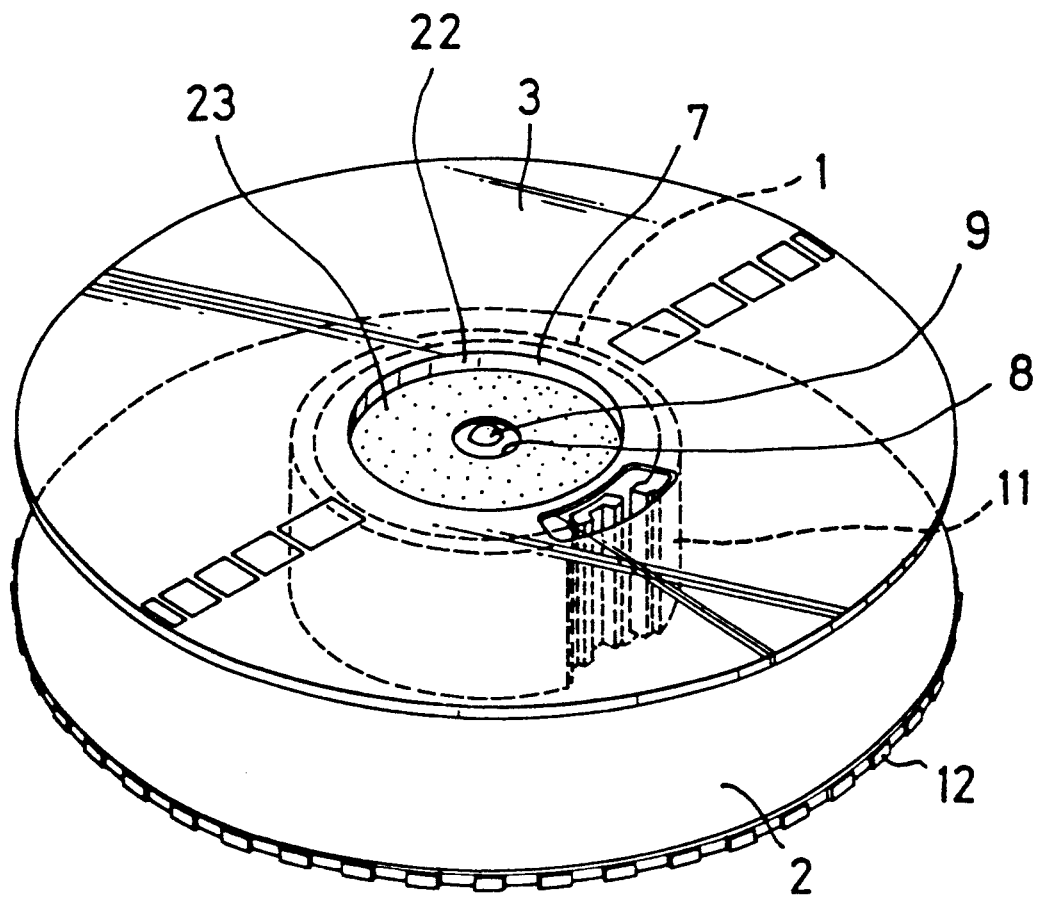
FIG. 6 is a perspective view showing an example of a cassette reel according to the present invention.

Now, an embodiment of a cassette reel according to the present invention will hereinafter be described in reference to FIGS. 6-9. In the present embodiment, this invention is implemented in a video tape cassette in the same manner as the prior art example shown in FIG. 1. The parts in FIGS. 6-9 corresponding to those in FIGS. 1-5 are designated by the same reference numerals and the explanation thereof will be omitted.

In the embodiment of the present invention as shown in FIGS. 6-9, the upper flange 3 has on its bottom surface 7B of the concave portion 7 an annular groove 22 along a side surface 7C of the concave portion 7 and extending downward. A foil layer 23 made of an opaque material such as a metallic foil layer, gold foil layer on the like is deposited on the bottom surface 7B of the concave portion 7 which is surrounded by the annular groove 22. The rest of the construction is the same as that of the aforementioned prior art shown in FIGS. 1-5.

Figure 7:
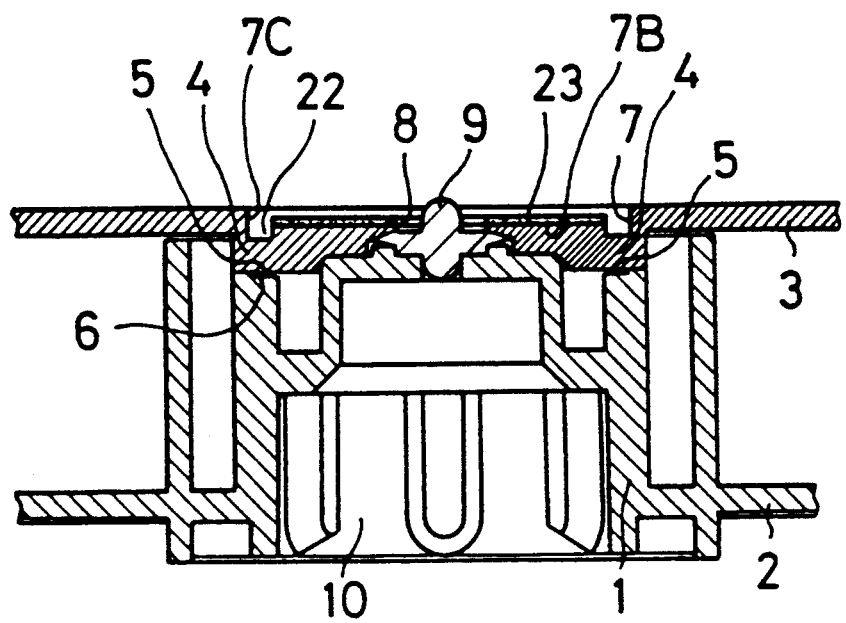
FIG. 7 is an enlarged cross-sectional view of a central portion of the cassette reel of the present invention shown in FIG. 6.
Figure 8:
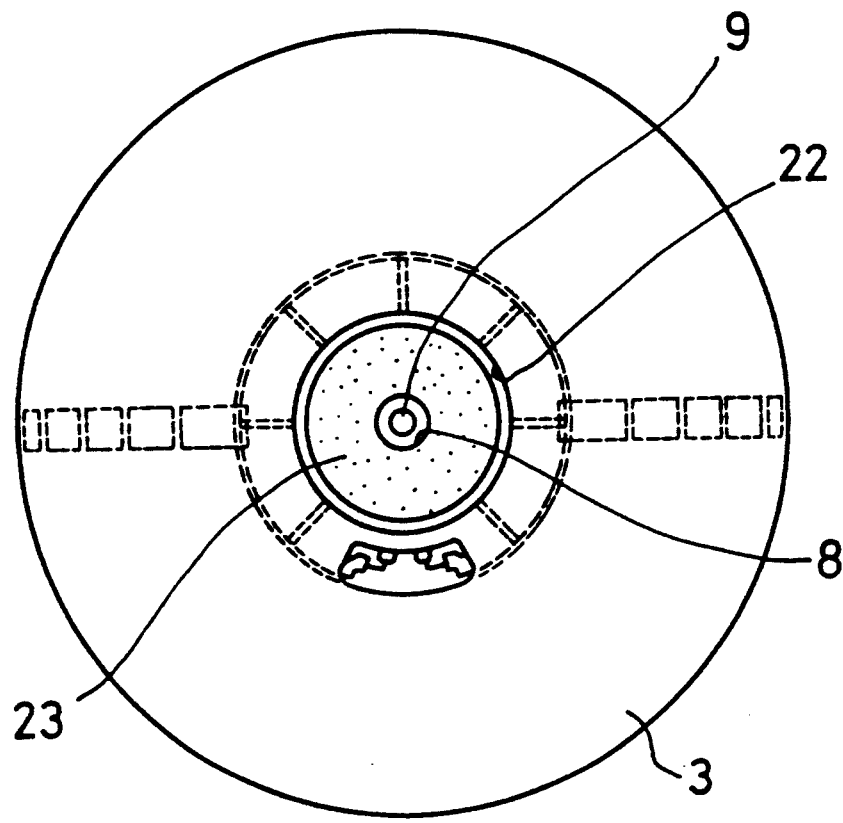
FIG. 8 is a top plan view of the cassette reel according to the present invention.
Figure 9:
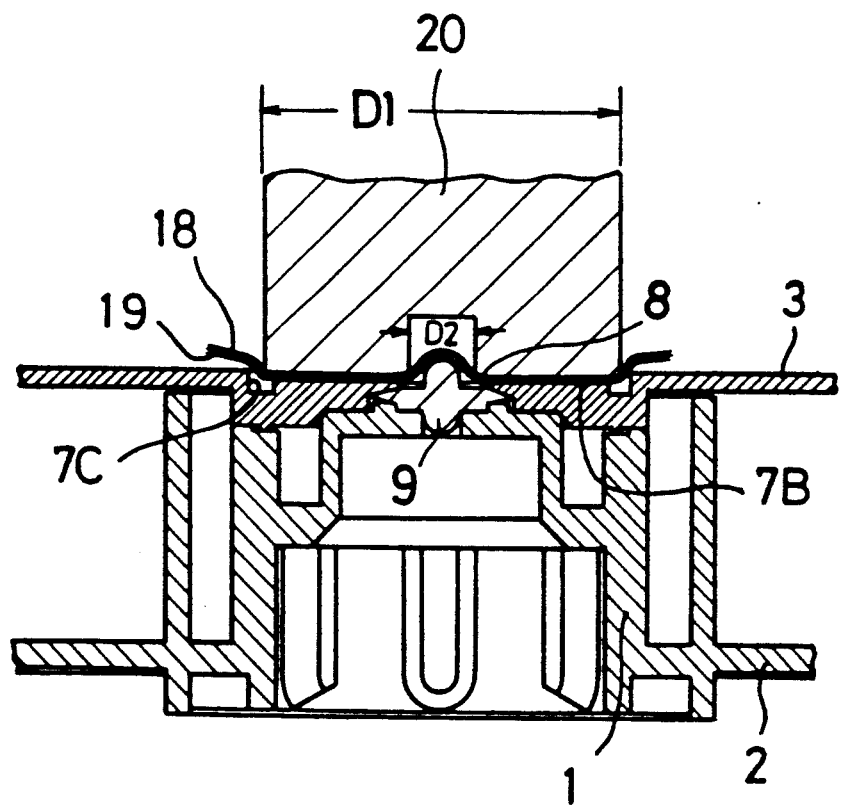
FIG. 9 is an enlarged cross-sectional view showing how a metallic foil is transferred to the center portion of an upper flange of the cassette reel according to the present invention.

As described above, for depositing the metallic foil layer 23, for example, on the bottom surface 7B of the concave portion 7, which is surrounded by the annular groove 22, as shown in FIG. 7, the transferable foil film 19 is placed on the bottom surface 7B of the concave portion 7, which is surrounded by the annular groove 22 and then the metallic foil 18 of the foil layer 19 is transferred to the bottom surface 7B by the use of the hard rubber 20, the outer diameter D1 of which is slightly greater than the diameter of the bottom surface 7B of the concave portion 7, and the inner diameter D2 of which is slightly smaller than the diameter of the aperture 8 provided through the bottom surface 7B of the concave portion 7. Since the hard rubber 20 has its outer diameter D1 determined slightly greater than the diameter of the bottom surface 7B of the concave portion 7 and the inner diameter D2 slightly smaller than the diameter of the aperture 8, the outer and inner peripheral edges of the metallic foil layer 23 can be cut sharply. Therefore, the metallic foil layer 23 with clear inner and outer peripheral edges can be deposited on the bottom surface 7B of the concave portion 7, which is surrounded by the annular groove 22. Therefore, the metallic foil layer 23 thus deposited can make the internal construction of the hub 1 invisible.

Another advantage obtained by the cassette reel according to the present invention is that the metallic foil layer 23 can produce decorative effects which have never been proposed in the prior art, so that the commercial value of the video tape cassette can be highly elevated.

Incidentally, the metallic foil layer 23 in the above described embodiment may be formed of gold, silver or other various metals, each of which can produce the same effects as described above.

The above description is given on a single preferred embodiment of the invention but it will be apparent that many modifications and variations could be effected by one skilled in the art without departing from the spirit or scope of the novel concepts of the invention so that the scope of the invention should be determined by the appended claim only.

We claim as our invention:

1. A method of applying a label to the flange of a tape cassette reel comprising the steps of forming a groove in a concave portion centered about the longitudinal axis of the reel in one of the flat surfaces of the reel, the groove extending about the periphery of the concave portion, and pressing a layer of foil onto the one flat surface by means of a hot rubber stamper having a diameter slightly greater than the diameter of the groove, whereby the edges of the groove sever the portion of the foil extending beyond the groove.

* * * * *